United States Patent
Ballard et al.

(10) Patent No.: US 8,015,373 B2
(45) Date of Patent: Sep. 6, 2011

(54) INFORMATION SHARING BETWEEN A BACKUP STORAGE DEVICE AND A MANAGEMENT APPLIANCE

(75) Inventors: Curtis C. Ballard, Eaton, CO (US); Mike P. Fleischmann, Fort Collins, CO (US); Kelly J. Reasoner, Fort Collins, CO (US); Steven Maddocks, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 11/129,588

(22) Filed: May 13, 2005

(65) Prior Publication Data
US 2006/0259720 A1    Nov. 16, 2006

(51) Int. Cl.
*G06F 12/16*    (2006.01)
(52) U.S. Cl. .................................... 711/161; 700/214
(58) Field of Classification Search .............. 711/161, 711/162; 700/214
See application file for complete search history.

(56) References Cited

U.S. PATENT DOCUMENTS

| | | | | |
|---|---|---|---|---|
| 6,101,322 A | * | 8/2000 | Goodrum et al. | 710/302 |
| 7,051,015 B1 | * | 5/2006 | Street et al. | 707/3 |
| 2003/0046324 A1 | * | 3/2003 | Suzuki et al. | 709/100 |
| 2003/0131026 A1 | * | 7/2003 | Cork et al. | 707/200 |
| 2005/0043852 A1 | * | 2/2005 | Gallo et al. | 700/214 |

* cited by examiner

*Primary Examiner* — Yong Choe

(57) ABSTRACT

Backup storage apparatus and related methods wherein communication capabilities are provided that allow information to be shared between devices installed in the apparatus to extend the functionality of the apparatus. A controller comprising a communication link is coupled to an operator control panel that controls functions of and displays information regarding the apparatus. An installable component that is operable to extend the functionality of the apparatus when coupled to the communication link, and is operable to discover services that are sharable between the controller and the component. When communications are established, the operator control panel via the shared services is also capable of controlling functions of and displaying information regarding the component.

22 Claims, 4 Drawing Sheets

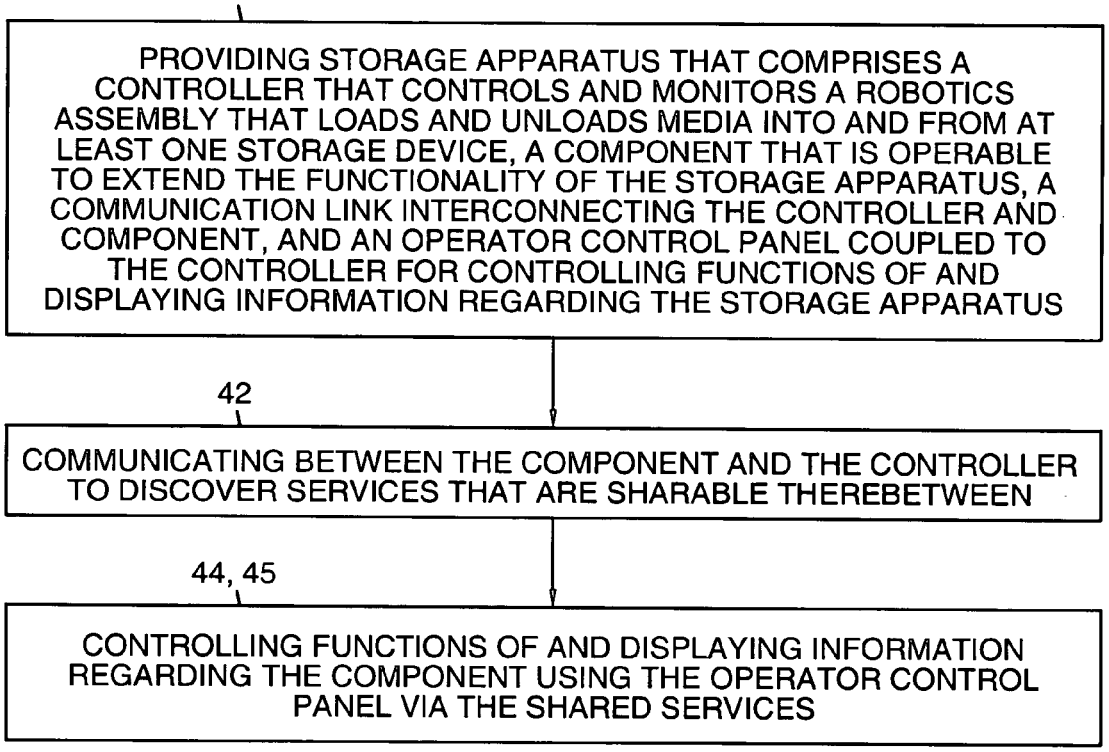

INFORMATION SHARING BETWEEN A BACKUP STORAGE DEVICE AND A MANAGEMENT APPLIANCE

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a StorageWorks brand of tape libraries are manufactured in various sizes and configurations. The number of tape cartridges that can be loaded into such tape libraries varies depending upon model, but may be on the order of 400-500 tapes, for example.

A typical tape library usually has a control and display panel where local functions are controlled and where the health of the tape library may be displayed. The display typically presents information about components in the tape library that are built by the original library manufacturer. However, additional value added components may be installed in the tape library including software tools to aid in the configuration, installation, and management of the tape library. Heretofore, there has been no way to present information about the value added components to a user who is working at the library by way of the control and display panel.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which:

FIG. 3 is a flow diagram that illustrates an exemplary information sharing method or algorithm.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other backup storage devices and systems, including optical drives and hard disk drives, for example.

Figure 1:
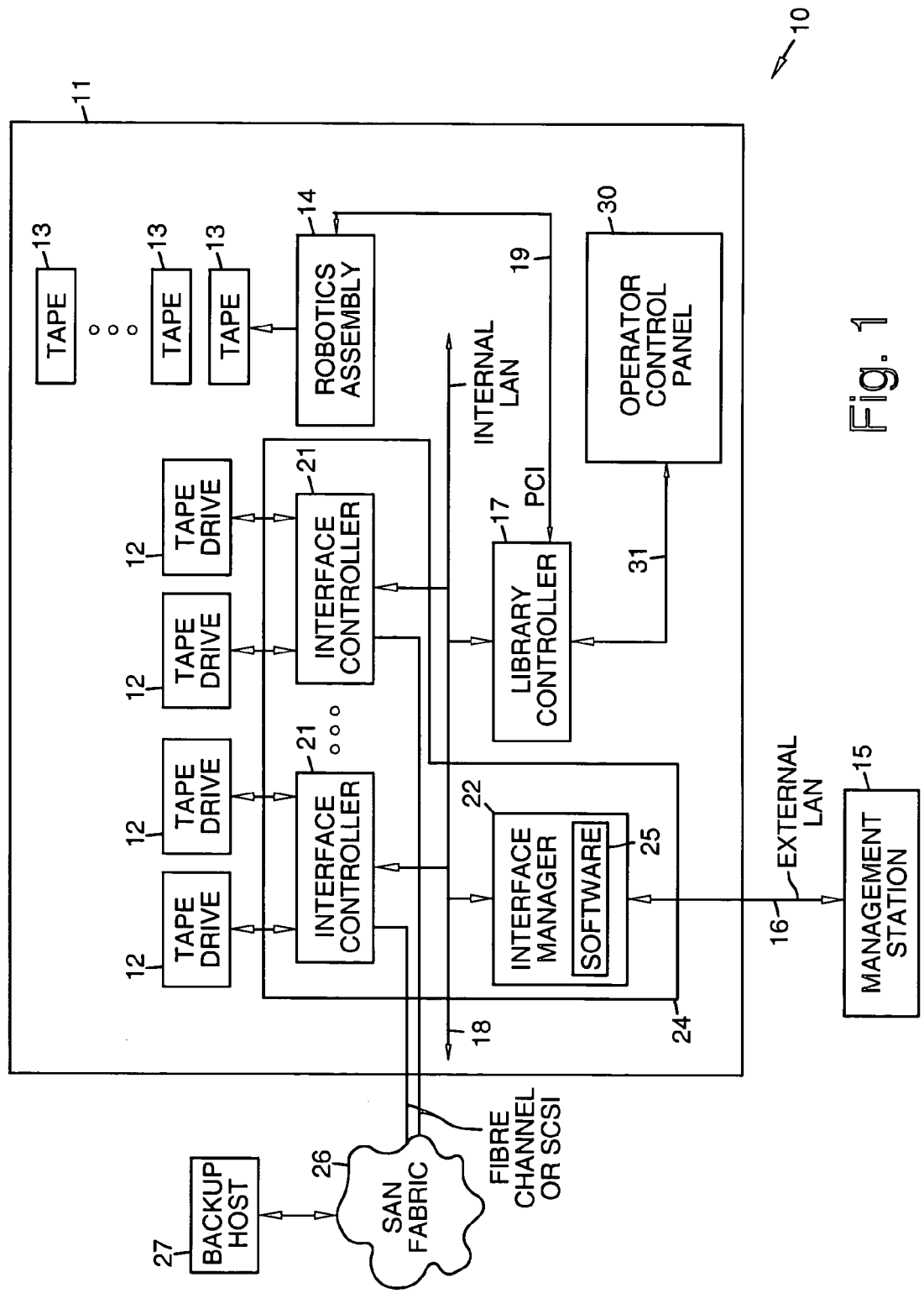
FIG. 1 is a block diagram that illustrates an exemplary tape library.

Referring to the drawing figures, FIG. 1 illustrates an exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage devices 12 would comprise optical disk drives or hard disk drives, while the storage media 13 for would comprise optical disks or hard disk media, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal local area network (LAN) 18 comprising a communication link 18.

One or more interface controllers 21 are coupled between selected tape drives 12 and the internal LAN 18. The interface controllers 21 provide a communication path for the interface manager 22 to talk to the tape drives 12. The interface controllers 21 also provide a controlled data path between the tape drives 12 and a backup server 27. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 26, but this is not commonly used in current-generation computers.

The interface manager 22 or management appliance 22 and the interface controllers 21 comprise the value added components 24 of the tape library 10, i.e., components that may not be manufactured and installed by the original library manufacturer.

A library controller 17 is coupled by way of the internal LAN 18 (communication link 18) to the one or more interface controllers 21 and to the interface manager 22 or management appliance 22. The library controller 17 is also coupled by the way of a private internal bus such as a PCI bus 19 to the robotics assembly 14.

The communication link 18 facilitates a general purpose information sharing protocol that extends the functionality of the tape library 10. To this end, the communication link 18 and information sharing protocol are used to register the library controller 17 with the interface manager 22 so that communication between the two devices is established. Registration is used herein to mean that communication is established between the interface manager 22 and the library controller 17. Such communication may be in the form of polls, for example, or any other mechanism to communicatively connect the interface manager 22 and the library controller 17. Thus, while the exemplary communication link 18 and information sharing protocol are discussed in terms of registration, it is to be understood that any communication arrangement that allows the interface manager 22 and the library controller 17 to identify and communicate with each other may be employed. Once the interface manager 22 is registered (i.e., communication is establish), the information sharing protocol and communication link 18 allow the operator control panel 30 to control functions of and display information regarding the interface manager 22.

The tape library 10 comprises an operator control panel and display system 30, referred to as an operator control panel 30 or OCP 30, which is preferably disposed on a front panel of the tape library 10, for ease of use. The operator control panel 30 controls local functions and displays information regarding the health of the tape library 10. The operator control panel 30 presents information about components in the tape library 10 that are built by the original library manufacturer.

The operator control panel 30 comprises a graphical user interface (GUI) that displays library status information and allows a user to access the library menus. These menus allow a user to view or change the library settings, run demonstration programs, and run diagnostic tests, for example.

The operator control panel 30 is coupled to the library controller 17, and is used to control functions of and display information regarding the tape library 10 in addition to components in the tape library 10 that are installed by the original library manufacturer. In particular the operator control panel 30 may be used to control functions of the interface manager 22 and display information known to it and to the interface controllers.

An exemplary OCP 30 has five buttons. These buttons may be used to scroll through screens and select options or commands. The functionality of these buttons changes depending on a currently displayed GUI screen.

The exemplary OCP 30 has two LED indicators. A green LED lights when the library 10 is fully operational and ready to accept host commands. The green LED flashes while the library 10 transitions from a READY state to a NOT READY state. The library 10 is not READY during power-on self-tests, when magazines are being released, or during access to certain menu items. A red LED lights when there is a library error. Both LEDs flash when there is a library fault that requires operator attention. The red and green LED's may be disposed in the same package and the library controller may be configured to turn on both at the same times at different intensities to produce an amber LED to signal a warning condition.

The interface manager 22 is a management card designed to consolidate and simplify the management of the tape library 10. The interface manager 22 is a tool that provides for graphical setup and configuration of the one or more interface controllers 21. The interface manager 22 also permits remote management of the interface controllers 21 via a web-based GUI or command line interface. The interface manager 22 allows a user to undertake storage area network-related (SAN-related) diagnostics of certain components of the library 10, such as drives 12, and robotics assembly 14.

As was mentioned above, the interface controllers 21 and interface manager 22 are not part of the originally manufactured tape library. The addition of the interface controllers 21 and interface manager 22 provide a data path access to the drives 12 that the original tape library supplier does not provide and provides for control over the configuration of fibre channel access controls which the original tape library supplier does not provide.

Three different user interfaces may be used to control the interface manager 22. These are a serial user interface, a Telnet interface, and a Command View TL interface.

The serial user interface uses a command line interface and connects directly to the interface manager 22 through an RS232 serial interface rather than through the external or LANs internal 16, 18. The serial user interface takes precedence over the Command View TL and Telnet user interfaces and prevents any other open sessions from communicating with the interface manager 22.

Command View TL Telnet user interface uses the same command line interface as the serial interface, but requires the IP address of the interface manager 22 to initiate the session. This IP address can be set through the serial interface, or a cascade port of the interface manager 22, or through the OCP 30. The advantage of using Telnet over the serial interface is that the user can Telnet from any client machine that is on the LAN 16, and a separate serial connection is not needed. The Telnet user interface has precedence over the Command View TL GUI and prevents any open Command View TL sessions from communicating with the library 10.

The Command View TL interface is a browser-based graphical user interface (GUI). This is a preferred user interface for controlling the interface manager 22 and is preferably used in most circumstances. From any client on the LAN 16, one can use a browser to access Command View TL, which is hosted on the management station 15.

The communication link 18 and information sharing protocol cooperate to register the library controller 17 with the interface manager 22. Once registered, the interface manager 22 and the library controller 17 communicate over the internal LAN 18 using shared data objects having a shared format (i.e., a format shared by the interface manager 22 and library controller 17). Furthermore, once the interface manager 22 and library controller 17 are registered (in communication) with each other, they communicate with each other to find or discover objects that may be shared (such as by polling each other). The interface manager 22 and library controller 17 share their respective lists of objects corresponding to services that they provide. In this way, the interface manager 22 discovers services that are provided by the library controller 17 and vice-versa. The library controller 17 uses the shared data objects sent by the interface manager 22 to generate information that is to be displayed on the OCP 30. Furthermore, communication between the interface manager 22 and the library controller 17 via the information sharing protocol and communication link 18 allow the operator control panel 30 to control functions of the interface manager 22 and display information heretofore only available to the interface manager 22.

Thus, information not directly available to the library controller 17, such as information that is available to the interface manager 22, can be combined using the shared data objects to provide a consistent display for the entire tape library 10 via the OCP 30. The library controller 17 can also take information from the OCP 30 or from it's Small Computer System Interface (SCSI) interface, or information about it's internal status, and update the shared data objects. The library controller 17 can then pass this data back to the interface manager 22 so that the interface manager 22 can combine the library information with the information it stores from the rest of the system so that it can present or provide the exact same state and consistent presentation of the data as the operator control panel 30.

An information sharing protocol, referred to as an out-of-band (OOB) protocol, is used to share information between the library controller 17 and the interface manager 22. Details of an exemplary out-of-band (OOB) information sharing protocol are presented in FIGS. 2a and 2b.

The exemplary information sharing protocol and communication link 18 are operable to extend the functionality of the tape library 10 by registering the library controller 17 (component 22) with the interface manager 22. Registration informs the interface manager 22 of the presence of the library controller 17, in the same way that a USB (IEEE 802.11b) or Firewire (IEEE 1394) device is automatically detected and registered when it is connected to this type of computer bus. There are techniques known to those skilled in the art that are readily available to provide such registration, such as the above-mentioned techniques used to register USB and Firewire devices, for example. Once the interface manager 22 is registered, the operator control panel 30 coupled to the library controller 17 is able to control functions of and display information available to the interface manager 22. This capability has not heretofore been provided in tape libraries.

The following is a description of an exemplary power up and new device detection process that may be employed in the tape library 10. This is one example of how power up and new device detection may be implemented, and it is to be understood that other methods may be used to create the communication link 18.

Devices in the tape library 10, such as the interface manager 22 or interface controllers 21, for example, are independent and may be added to or removed from the tape library 10 without disturbing other devices. When a device is added to the tape library 10, it powers up without any other device telling it to initialize, and sends a signal out over the communication link 18 notifying all devices that are present that it has been added to the tape library 10. The interface manager 22 responds to that signal and provides information to that device comprising communication parameters for communicating over the communication link 18.

After the added device is configured for communication, the interface manager 22 initiates a request for a list of services provided by the new device over the communication link 18 using the information sharing protocol. The interface manager 22 may also provide information about the new device to other devices in the tape library 10. Periodic communication with the device can be used to detect whether the device is still present, and if it is removed, the services that it provides are removed from the list of all available services.

Alternatively, devices in the tape library 10 may run a discovery mechanism using any method known in the art to locate new devices when they are introduced added to the tape library 10. The same discovery mechanism detects when a device has been removed from the tape library 10.

Figure 2A:
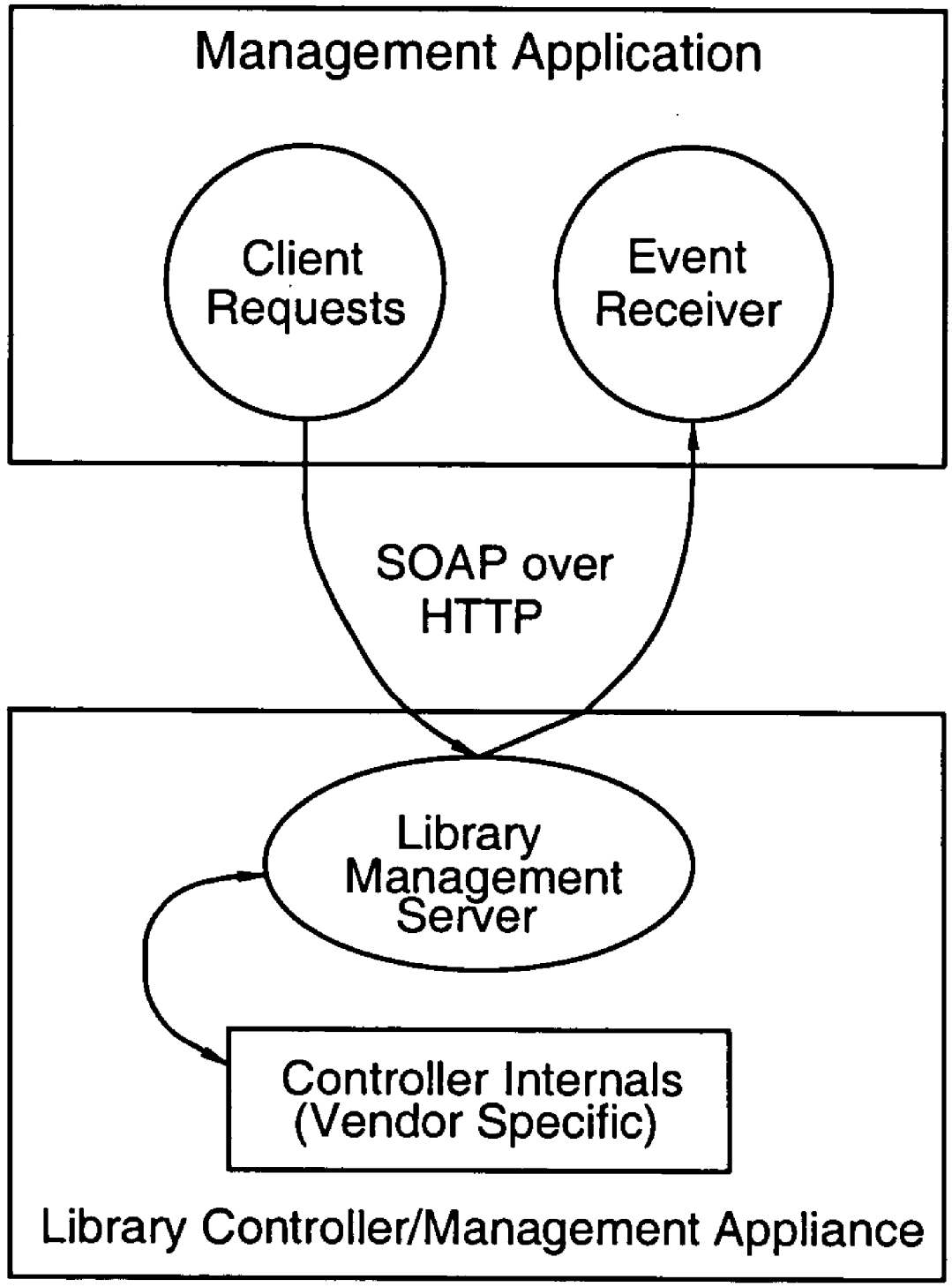
FIGS. 2a and 2b illustrate an exemplary information sharing protocol for use with the tape library.
Figure 2B:
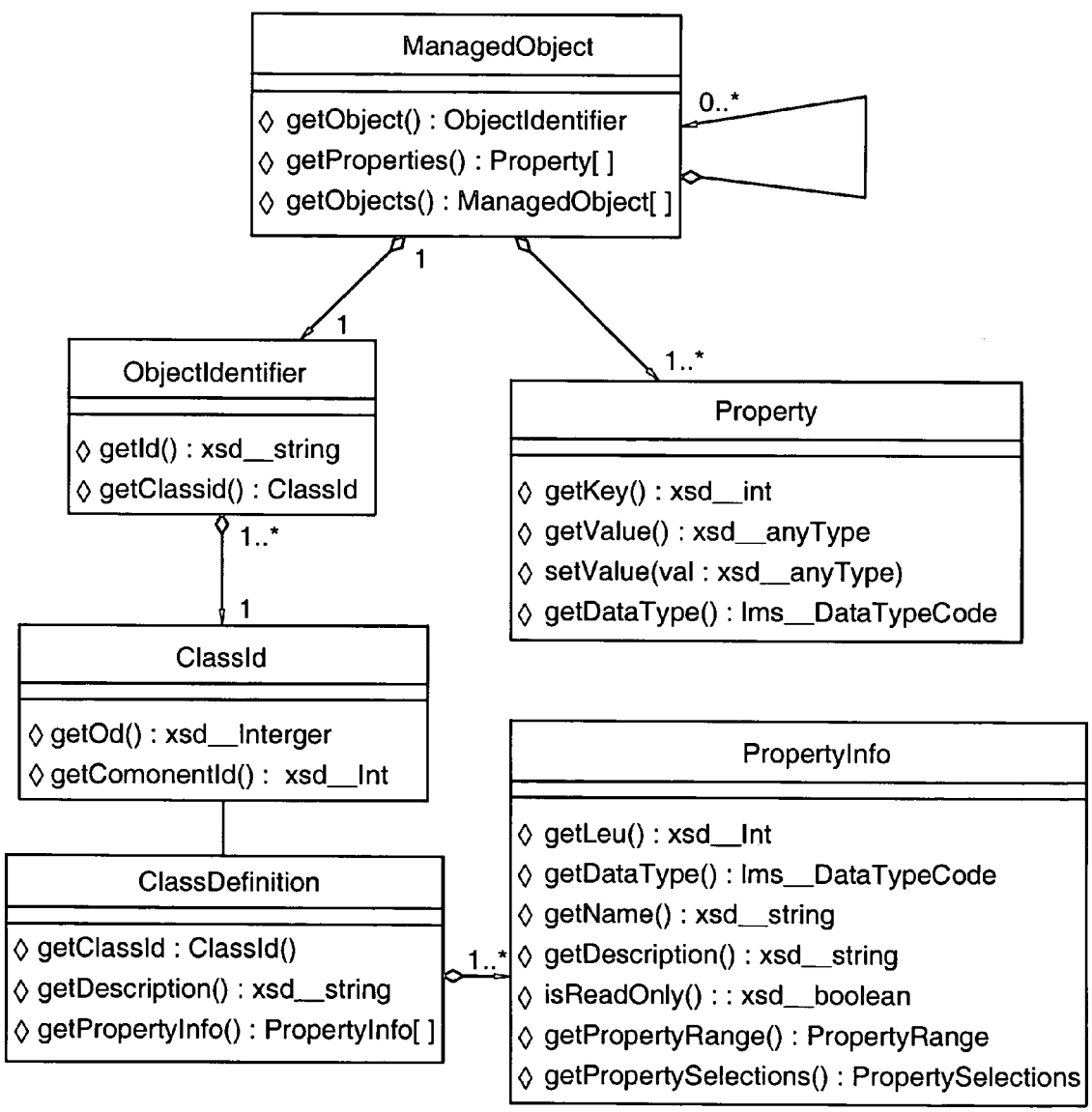

FIG. 2a illustrates client/server components employed in implementing the information sharing protocol. The exemplary information sharing protocol provides for a method for programmatically managing a device in a client/server environment. An exemplary method involves implementing a flexible object model using a light weight SOAP web service on both an embedded device management card and a management client. SOAP (Simple Object Access Protocol) is a lightweight XML-based messaging protocol used to encode the information in Web service request and response messages before sending them over a network. This enables the execution of synchronous and asynchronous device operations from the management client, as well as the transfer of device information and status.

With regard to the tape library 10, the management client refers to the management station 15, which is a system located external to the tape library 10 on the external LAN 16 that connects to the interface manager 22 over the external LAN 16. The management application is software that runs on the interface manager 22 along with the interface manager hardware and software running on the management station 15.

Note that devices in the library 10 are essentially peers and each provides services and is a client with respect to services that another device provides. That means that the term "client" when referring to internal devices of the library 10 does not reference a specific device. Thus, the management client may also refer to the library controller 17, the interface manager 22, or the management station 15. For example, if the interface manager 22 retrieves data from the library controller 17 using the information sharing protocol, then it acts as a management client. If the library controller 17 is retrieving data from the interface manager 22 (or display on the OCP 30, then it acts as a management client.

In the exemplary method, the tape library 10 is controlled by a management application. The SOAP web service, referred to as a Library Management Server, is implemented on the interface manager 22 and the library controller 17 of the tape library 10. The management card requires a network interface (LAN 18) to enable client connectivity. The management application also implements a SOAP web service. This web service, referred to as an Event Receiver, receives events and status from the Library Management Server.

In a typical scenario, the Management Application makes client requests to the Library Management Server. A request could be a synchronous request for device information, or it could initiate an asynchronous request. For asynchronous requests, intermediate and final status of the request is sent by the Library Management Server to the Event Receiver during the processing of the request.

Many web services provide a fixed data model that clients may access. This results in compatibility issues between the client and server and makes it difficult to extend the server capabilities. Instead of a fixed data model, this method employs a self-describing, self-referencing object model along with a standard set of operations to enable extensibility and minimize compatibility issues. This model, referred to as a Managed Object Framework, is described by a UML class diagram shown in FIG. 2b.

In this model, each object returned from the web service is associated with a ClassDefinition. The ClassDefinition is identified by its Classid and describes the attributes or properties available for a specific type of object. Each property is described by a PropertyInfo object. The property information includes data type, descriptive information, and property validation. The server must implement a getClassDefinition operation so that a client may determine which objects are available from the server. A client may then retrieve a specific instance of an object defined by a ClassDefinition by calling the getManagedObject operation. The server returns a ManagedObject. The ManagedObject contains a set of property values for each property specified in the ClassDefinition. The server may also implement standard operations to modify the contents of the object. To extend the model, new properties may be added to existing ClassDefinitions, or new ClassDefinitions may be supported by the server.

The exemplary OOB protocol thus comprises polling and event driven notifications that provide for information sharing. This allows the library controller 17 to receive information from and send information to the interface manager 22 so that the operator control panel 30 displays information about the entire tape library 10 including any value added components (i.e., the interface manager 22 and the interface controllers 21). The OOB protocol also synchronizes information transmitted between the library controller 17 and the interface manager 22 to maintain consistent views of the information.

More particularly, the exemplary OOB protocol comprises a synchronization process to maintain consistent views of the information between the library controller 17 and the interface manager 22. By "consistent views of the information", it is meant that when the library controller 17 reports a fault condition (or state change), the same fault condition is reported at the same time via all management interfaces, including the operator control panel 30 and the interface manager 22. Likewise when the interface manager 22 detects a fault condition, the same condition is reported over all library native interfaces such as the operator control panel 30. This prevents cases where the interface manager 22 detects a condition such as a drive hard error but the library controller 17 is not aware of the error and reports the drive status as good. Synchronization is achieved by sharing data objects between the library controller 17 and the interface manager 22.

The information sharing protocol thus comprises a self-describing, self-referencing object model that allows interfaces employing the protocol to register with each other, report those objects they support, and use plain text strings, data types, lengths, and values that define how to use the data. All interfaces employing the protocol, including the library controller 17, operator control panel 30 and interface manager 22, for example, can use the data description to build a presentation format for displaying that data on the interface. Furthermore, the data can be changed via any of the interfaces.

Thus, the library controller 17 and interface manager 22 are configured to have two way communication. The library controller 17 and the interface manager 22 communicate using the information sharing protocol so that the library controller 17 is registered with the interface manager 22. The interface manager 22 contains information about the value added components 24 that is normally not available to the operator control panel 30. The exemplary OOB protocol allows this inter-communication to occur between the operator control panel 30 (via the library controller 17) and the interface manager 22. The operator control panel 30 communicates by way of the library controller 17 with the interface manager 22 using the shared data objects and presents information about the value added components 24 to a user viewing the operator control panel 30.

In summary, the exemplary tape library 10 employs an information sharing protocol using shared data objects that facilitates registration of and communication between value added components 24 (interface manager 22 and interface controller 21) and original equipment components (library controller 17 coupled to the operator control panel 30). The library controller 17 automatically registers with the interface manager 22. Information that is available to the interface manager 22 would not normally be available to the library controller 17 for display on the operator control panel 30. The operator control panel 30 is able to control functions provided by the interface manager 22. Information that is available to the library controller 17 would not normally be available to the interface manager 22. Shared data objects are constructed that combine the information available to both the interface manager 22 and the library controller 17, and are communicated between them. Thus, information displayed on the operator control panel 30 includes information derived from both the library controller 17 and the interface manager 22. Information that is available through user interfaces of the interface manager 22 (serial, Telnet, and Command View TL) include information derived from both the interface manager 22 and the library controller 17.

Shared data objects are communicated in real time between the library controller 17 and the interface manager 22 so that both of them have a consistent view of the union of the information that they both have access to. That consistent view of the union of the information allows them to generate a view that is shown on the operator control panel 30, or a command line session, or a Command View GUI, and always have the data and the same presentation regardless of where the information came from or whether the interface manager 22 or the library controller 17 created that particular view.

This solution requires no external networks to be installed or accessed in order to obtain information about the value added components 24 installed in the tape library 10. This solution also does not require any external network to be configured in order to view information relating to all components installed in the tape library 10.

Thus, the interface manager 22 or management appliance 22 shares information with the library controller 17 which did not previously exist in tape libraries. Also, the interface manager 22 and the library controller 17 have a way to keep their information synchronized so they both report the same view of the tape library 10 to a user.

FIG. 3 is a flow diagram that illustrates an exemplary method 40 or algorithm 40. The exemplary method 40 or algorithm 40 may be used with storage apparatus 10 such as magnetic tape libraries, optical drives and hard disk drives, for example, although it is described with reference to use with a tape library 10. The exemplary method 40 or algorithm 40 comprises the following actions.

A tape library 10 (storage apparatus 10) is provided 41 that comprises a controller 17 that controls and monitors a robotics assembly 14 that loads and unloads tape cartridges 13 into and from at least one tape drive 12, a component 22 that is operable to extend the functionality of the tape library 10 (storage apparatus 10), a communication link 18 interconnecting the controller 17 and component 22, and an operator control panel 30 coupled to the controller 17 for controlling functions of and displaying information regarding the tape library 10 (storage apparatus 10).

The component 22 and the controller 17 communicate 42 to discover services that are sharable therebetween. The operator control panel 43 controls functions of and displays 44 information regarding the component using the shared services.

Thus, a backup storage apparatus and method or algorithm have been disclosed. It is to be understood that the above-described embodiments are merely illustrative of some of the many specific embodiments that represent applications of the principles described herein. Clearly, numerous and other arrangements can be readily devised by those skilled in the art.

What is claimed is:

1. Backup storage apparatus comprising:
   a controller for controlling and monitoring a robotics assembly that loads and unloads storage media into and from at least one storage device, and comprising a communication link;
   an operator control panel coupled to the controller for controlling functions of and displaying information regarding the apparatus; and a component including an interface manager and at least one interface controller, the component operable to extend the functionality of the apparatus when coupled to the communication link, and operable to discover services that are sharable between the controller for controlling and monitoring the robotics assembly and the component;

wherein when communications are established, the operator control panel via the shared services is also capable of controlling functions of and displaying information regarding the component.

2. The apparatus recited in claim 1 wherein the at least one storage device is selected from a group including magnetic tape drives, optical drives and hard disk drives, and wherein the storage media is respectively selected from a group including magnetic tape, optical disk and hard disk media devices.

3. The apparatus recited in claim 1 wherein the communications link facilitates an information sharing protocol that comprises a self-describing, self-referencing object model embodied in a light weight Simple Object Access Protocol (SOAP) web service implemented on the component and the controller.

4. The apparatus recited in claim 1 wherein the communications link facilitates an information sharing protocol that comprises a self-describing, self-referencing object model that allows interfaces employing the protocol to report and update shared data objects that they support.

5. The apparatus recited in claim 1 wherein the communications link facilitates an information sharing protocol that comprises a self-describing, self-referencing object model using plain text strings, data types, lengths, and values that define how to use such data.

6. The apparatus recited in claim 1 wherein the communications link facilitates an information sharing protocol that comprises a self-describing, self-referencing object model wherein all interfaces employing the protocol use data descriptions to build a presentation format for displaying data on their respective interfaces, the data descriptions being changeable.

7. The apparatus recited in claim 1 wherein the communications link facilitates an information sharing protocol that comprises polling and event driven notifications.

8. The apparatus recited in claim 1 wherein the communications link facilitates an information sharing protocol that synchronizes information transmitted between the controller and the component so that substantially the same conditions are presented by the operator control panel and the component at substantially the same time.

9. The apparatus recited in claim 1 wherein the component comprises serial, Telnet, and command line interfaces, and wherein the respective interfaces each present information derived from both the component and the controller.

10. Apparatus comprising:
library controller means for controlling and monitoring a robotics assembly that loads and unloads storage media into and from at least one storage device, and comprising a communication link;
an operator control means coupled to the controller means for controlling functions of and displaying information regarding built-in components of the apparatus; and
a communications link for establishing communications with an aftermarket installable component, the installable component including an interface manager and at least one interface controller, the interface manager and the at least one interface controller of the installable component operable to extend the functionality of the apparatus when coupled to the communication link, and the interface manager and the at least one interface controller of the installable component operable to discover services that are sharable between the library controller means and the installable component;

wherein when communications are established between the interface manager and the library controller means, the operator control means via the shared services is also capable of controlling functions of and displaying information not directly available to the library controller means, the information regarding the installable component and previously only available to the interface manager.

11. The apparatus recited in claim 10 wherein the at least one storage device is selected from a group including magnetic tape drives, optical drives and hard disk drives, and wherein the storage media is respectively selected from a group including magnetic tape, optical disk and hard disk media devices.

12. The apparatus recited in claim 10 wherein communications link facilitates an information sharing protocol that comprises a self-describing, self-referencing object model that allows interfaces employing the protocol to report and update shared data objects that they support.

13. The apparatus recited in claim 12 wherein the communications link facilitates an information sharing protocol that comprises a self-describing, self-referencing object model using plain text strings, data types, lengths, and values that define how to use such data.

14. The apparatus recited in claim 12 wherein the communications link facilitates an information sharing protocol that comprises a self-describing, self-referencing object model wherein all interfaces employing the protocol use data descriptions to build a presentation format for displaying data on their respective interfaces, the data descriptions being changeable.

15. The apparatus recited in claim 12 wherein the communications link facilitates an information sharing protocol that synchronizes information transmitted between the controller and the component so that substantially the same conditions are presented by the operator control means 30 and the component at substantially the same time.

16. A method for use with storage apparatus, comprising:
providing storage apparatus that comprises a controller having a communication link, a component including an interface manager and at least one interface controller, the component operable to extend the functionality of the apparatus, and an operator control panel coupled to the controller for controlling functions of and displaying information regarding the apparatus;
communicating between the component and the controller to discover services that are sharable therebetween;
controlling functions of and displaying information regarding the component using the operator control panel via the shared services; and
wherein the communications link facilitates an information sharing protocol that comprises a self-describing, self-referencing object model that allows interfaces employing the protocol to report and update shared data objects that they support.

17. The method recited in claim 16 wherein the storage apparatus is selected from a group including magnetic tape drives, optical drives and hard disk drives, and wherein the storage media is respectively selected from a group including magnetic tape, optical disk and hard disk media devices.

18. The method recited in claim 16 wherein the communications link facilitates an information sharing protocol that comprises a self-describing, self-referencing object model wherein all interfaces employing the protocol use data descriptions to build a presentation format for displaying data on their respective interfaces, the data descriptions being changeable.

19. The method recited in claim 16 wherein the communications link facilitates an information sharing protocol that synchronizes information transmitted between the controller and the component so that substantially the same conditions are presented by the operator control panel and the component at substantially the same time.

20. A tape library, comprising:
a controller coupled to an operator control panel that controls functions of and displays information about the tape library;
a communications link coupled to the controller;
an interface manager provided for registering a value-added device configured to be added to or removed from the tape library without disturbing other devices in the tape library, the value-added device powering up when added to the tape library and sending a signal out notifying the other devices present the tape library that the value-added device has been added to the tape library, the interface manager responding to the signal and providing information to the value-added device comprising communication parameters for communicating over the communication link;
wherein after the value-added device is configured for communicating over the communication link, the interface manager initiates a request for a list of services provided by the value-added device, and the interface manager providing information about the value-added device to the other devices in the tape library.

21. The tape library of claim 20, wherein periodic communication with the value-added device detects whether the value-added device is still present, and if the value-added device is removed, the services provided by the value-added device are removed from a list of all available services.

22. The tape library of claim 20, wherein information not directly available to the library controller is combined using shared data objects to provide a consistent display for the entire tape library.

* * * * *